United States Patent
Ostergren et al.

(10) Patent No.: US 10,399,093 B2
(45) Date of Patent: Sep. 3, 2019

(54) FLUIDIC CHIP FOR SPRAY NOZZLES

(71) Applicant: ILLINOIS TOOL WORKS INC., Glenview, IL (US)

(72) Inventors: Kristian A. Ostergren, Alingsas (SE); Gunter Wozniak, Bobritzsch (DE); Thomas Richter, Munster (DE)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/517,526

(22) PCT Filed: Aug. 19, 2015

(86) PCT No.: PCT/US2015/045929
§ 371 (c)(1),
(2) Date: Apr. 7, 2017

(87) PCT Pub. No.: WO2016/060736
PCT Pub. Date: Apr. 21, 2016

(65) Prior Publication Data
US 2017/0304848 A1      Oct. 26, 2017

Related U.S. Application Data

(60) Provisional application No. 62/064,068, filed on Oct. 15, 2014.

(51) Int. Cl.
| | |
|---|---|
| *B05B 1/08* | (2006.01) |
| *B60S 1/52* | (2006.01) |
| *F15C 1/22* | (2006.01) |
| *B05B 1/04* | (2006.01) |
| *B05B 1/10* | (2006.01) |

(52) U.S. Cl.
CPC ............... *B05B 1/04* (2013.01); *B05B 1/08* (2013.01); *B05B 1/10* (2013.01); *B60S 1/52* (2013.01); *F15C 1/22* (2013.01); *Y10T 137/2234* (2015.04)

(58) Field of Classification Search
CPC .... B05B 1/04; B05B 1/08; B05B 1/10; B05B 1/52; F15C 1/22; B60S 1/52; Y10T 137/2185; Y10T 137/2224; Y10T 137/2234
USPC ...................................... 239/589.1
See application file for complete search history.

(56) References Cited

U.S. PATENT DOCUMENTS

| | | |
|---|---|---|
| 3,614,961 A | 10/1971 | Nekrasov et al. |
| 4,157,161 A | 6/1979 | Bauer |
| 4,231,519 A | 11/1980 | Bauer |

(Continued)

FOREIGN PATENT DOCUMENTS

| | | |
|---|---|---|
| CN | 101532760 | 9/2009 |
| CZ | 286790 B6 | 7/2000 |

(Continued)

OTHER PUBLICATIONS

ISR & WO for PCT/US2015/045929 dated Nov. 6, 2015.

*Primary Examiner* — Alexander M Valvis
(74) *Attorney, Agent, or Firm* — Quarles & Brady LLP

(57) ABSTRACT

A fluidic chip defining an oscillator device for a spray system which provides a fan spray pattern of a fluid mixture at low temperature conditions while using standard fluid pump pressures. The fluidic chip configurations as described may provide a substantially stable exit fan angle at temperatures as low as about −10 degrees Celsius.

20 Claims, 5 Drawing Sheets

(56) References Cited

U.S. PATENT DOCUMENTS

| | | | |
|---|---|---|---|
| 4,310,871 A | 1/1982 | Adachi | |
| 4,367,923 A | 1/1983 | Ishikawa | |
| 4,596,364 A | 6/1986 | Bauer | |
| 4,618,096 A | 10/1986 | Kondo et al. | |
| 4,644,854 A | 2/1987 | Stouffer et al. | |
| 4,645,126 A | 2/1987 | Bray, Jr. | |
| 4,694,992 A | 9/1987 | Stouffer | |
| 4,709,622 A | 12/1987 | Stouffer et al. | |
| 5,749,525 A | 5/1998 | Stouffer | |
| 5,820,026 A | 10/1998 | Raghu | |
| 5,820,034 A | 10/1998 | Hess | |
| 5,845,845 A | 12/1998 | Merke et al. | |
| 5,906,317 A | 5/1999 | Srinath | |
| 6,062,491 A | 5/2000 | Hahn et al. | |
| 6,186,409 B1 | 2/2001 | Srinath et al. | |
| 6,240,945 B1 | 6/2001 | Srinath et al. | |
| 6,253,782 B1 | 7/2001 | Raghu | |
| 6,457,658 B2 | 10/2002 | Srinath et al. | |
| 6,467,701 B2 | 10/2002 | Martin | |
| 6,520,424 B1 | 2/2003 | Lesser et al. | |
| 6,805,164 B2 | 10/2004 | Stouffer | |
| 7,014,131 B2 | 3/2006 | Berning et al. | |
| 7,111,793 B2 | 9/2006 | Maruyama et al. | |
| 7,267,290 B2 | 9/2007 | Gopalan et al. | |
| 7,293,722 B1 | 11/2007 | Srinath et al. | |
| 7,302,731 B2 | 12/2007 | Maruyama et al. | |
| 7,314,188 B2 | 1/2008 | Watson et al. | |
| 7,354,008 B2 | 4/2008 | Hester et al. | |
| 7,472,848 B2 | 1/2009 | Gopalan et al. | |
| 7,478,764 B2 | 1/2009 | Gopalan | |
| 7,506,823 B2 | 3/2009 | Eisele et al. | |
| 7,651,036 B2 | 1/2010 | Gopalan | |
| 7,677,480 B2 | 3/2010 | Russell et al. | |
| 7,775,456 B2 | 8/2010 | Gopalan et al. | |
| 8,061,630 B2 | 11/2011 | Utz | |
| 8,172,162 B2 | 5/2012 | Gopalan et al. | |
| 8,382,043 B1 | 2/2013 | Raghu | |
| 8,418,725 B2 | 4/2013 | Schultz et al. | |
| 8,646,483 B2 * | 2/2014 | Schultz | E21B 28/00 137/835 |
| 2001/0003352 A1 * | 6/2001 | Ruden | B60S 1/50 239/284.2 |
| 2001/0019086 A1 | 9/2001 | Srinath et al. | |
| 2003/0234303 A1 | 12/2003 | Berning et al. | |
| 2007/0257133 A1 | 11/2007 | Bettenhausen et al. | |
| 2011/0061692 A1 | 3/2011 | Gopalan et al. | |
| 2013/0291981 A1 | 11/2013 | Lengers et al. | |

FOREIGN PATENT DOCUMENTS

| | | |
|---|---|---|
| DE | 19523760 C2 | 7/1997 |
| DE | 102005022307 | 12/2005 |
| DE | 102013224040 A1 | 5/2015 |
| EP | 1053059 A1 | 11/2000 |
| EP | 1121201 A1 | 8/2001 |
| EP | 1827703 A1 | 9/2007 |
| EP | 2554854 A2 | 2/2013 |
| EP | 2644999 A1 | 10/2013 |

* cited by examiner

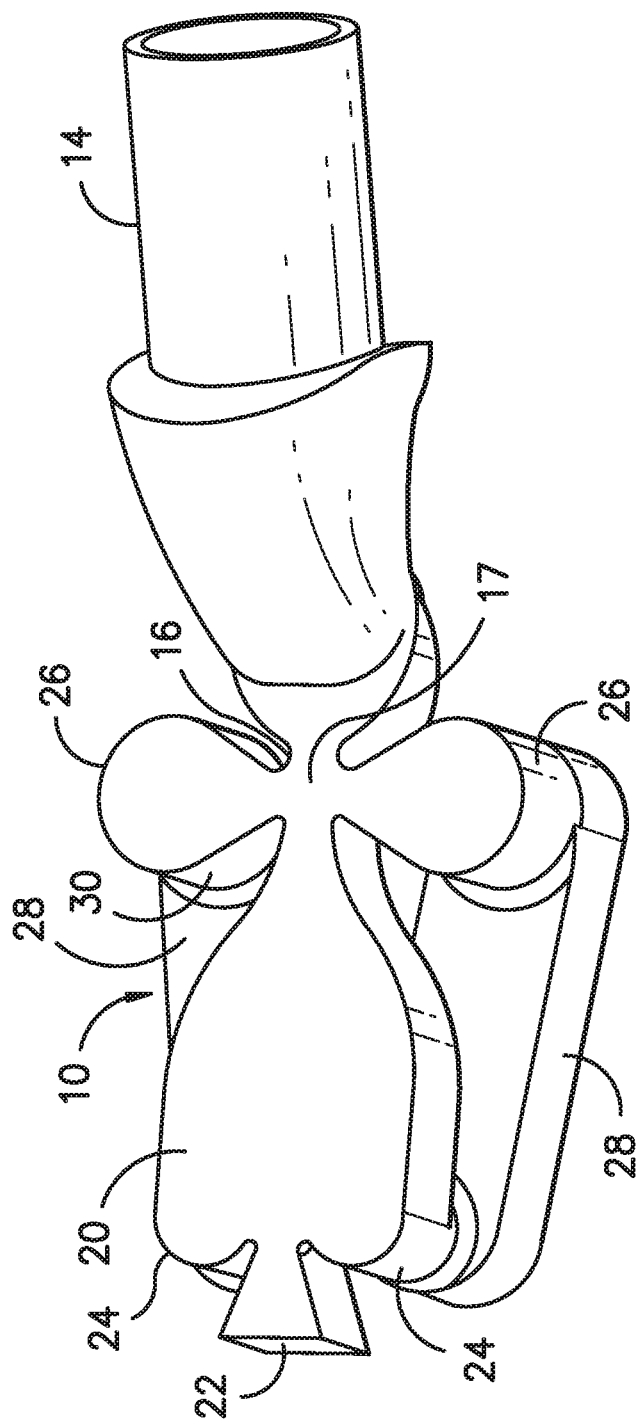
FIG. -1-

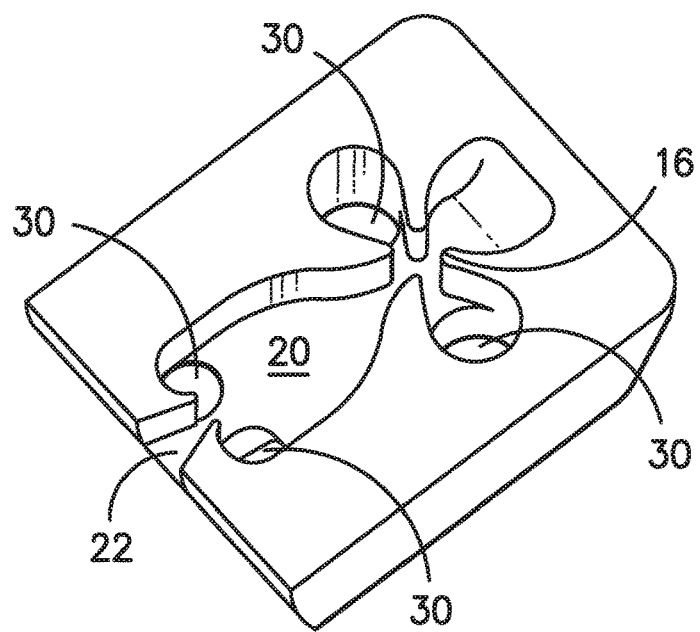
FIG. -2-
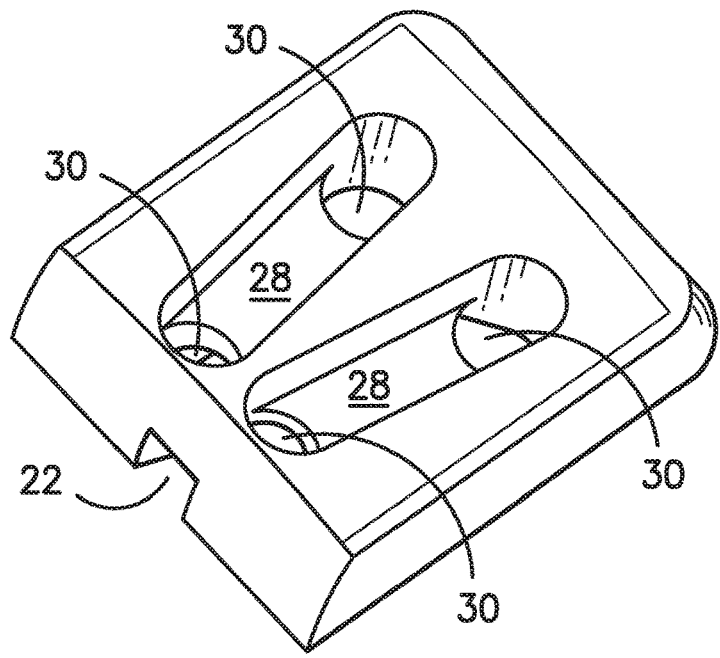
FIG. -3-

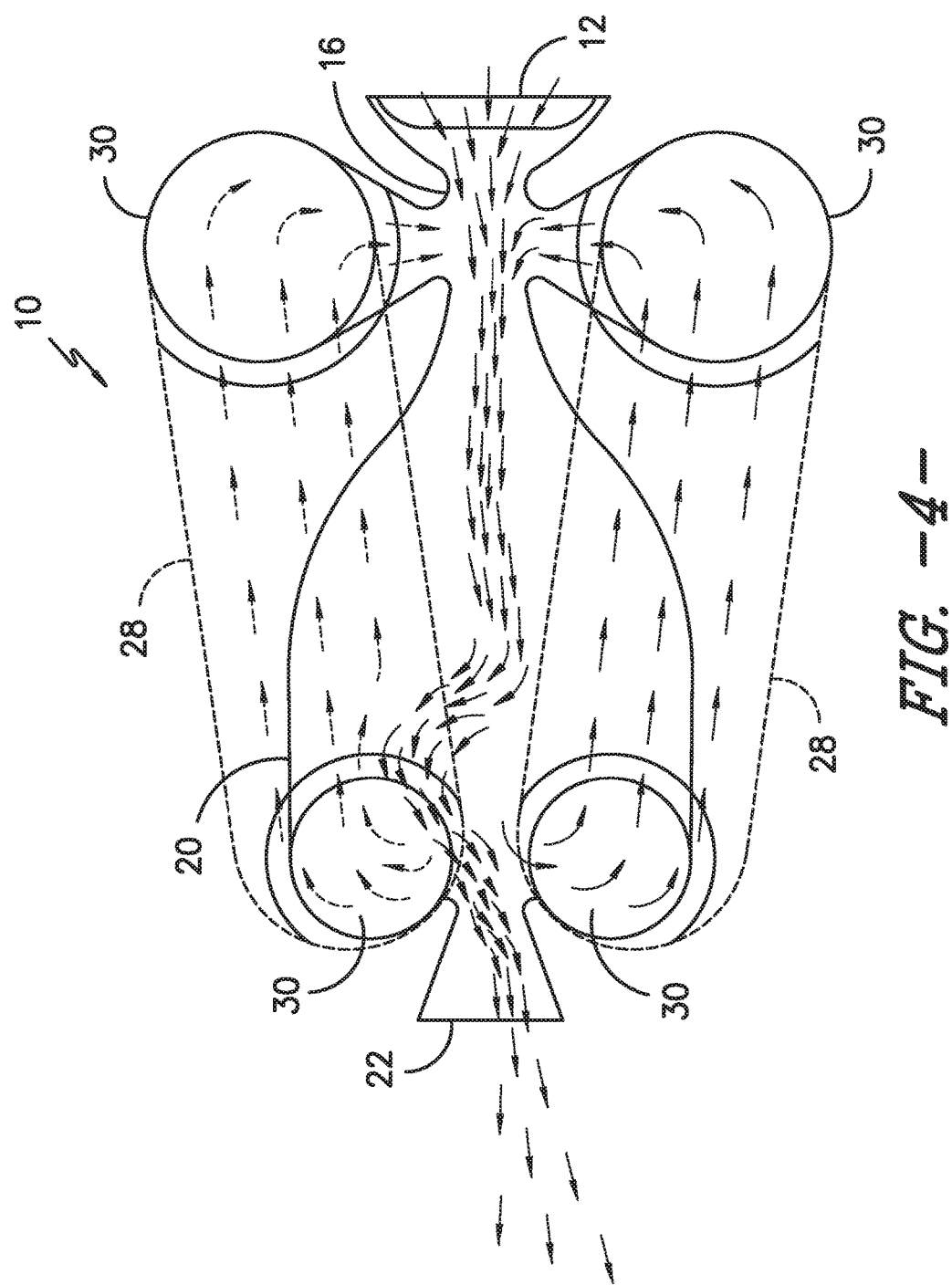
FIG. -4-

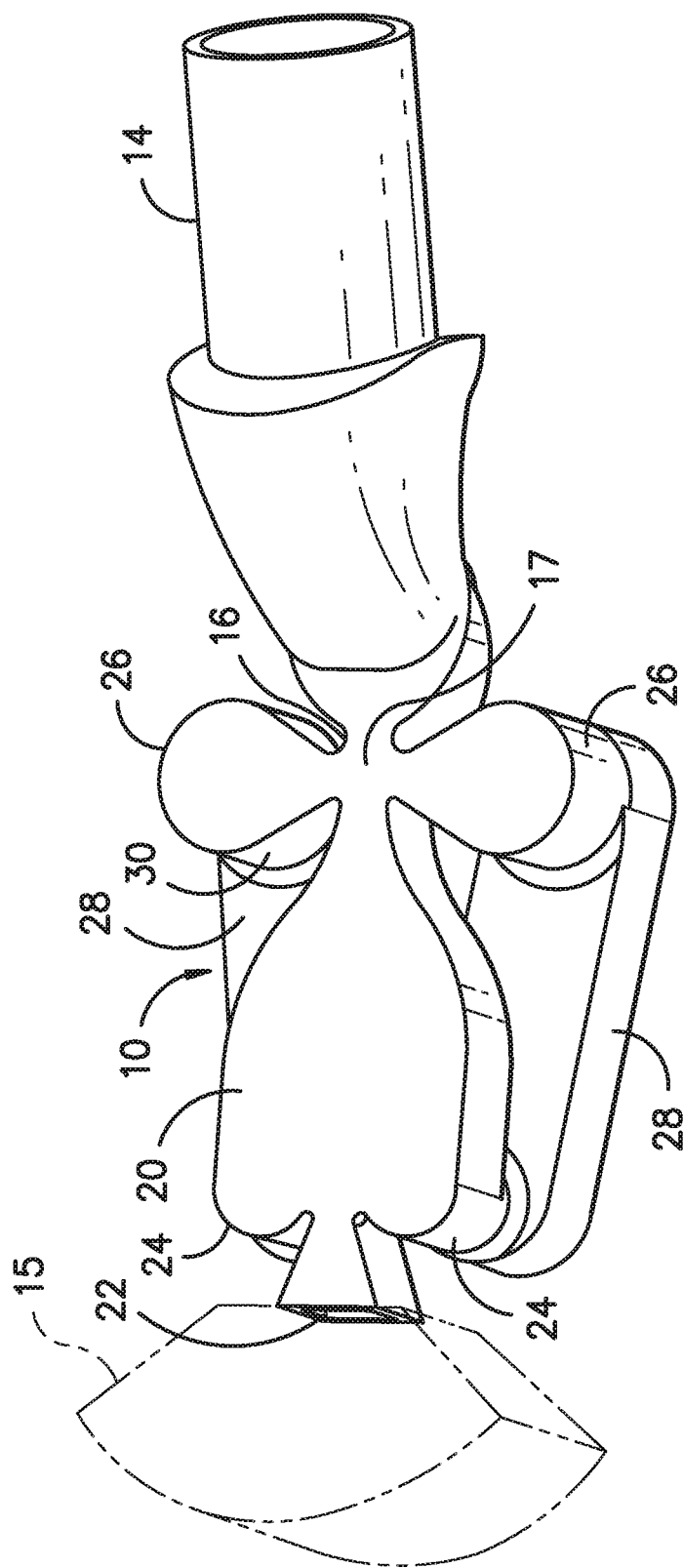
FIG. -5-

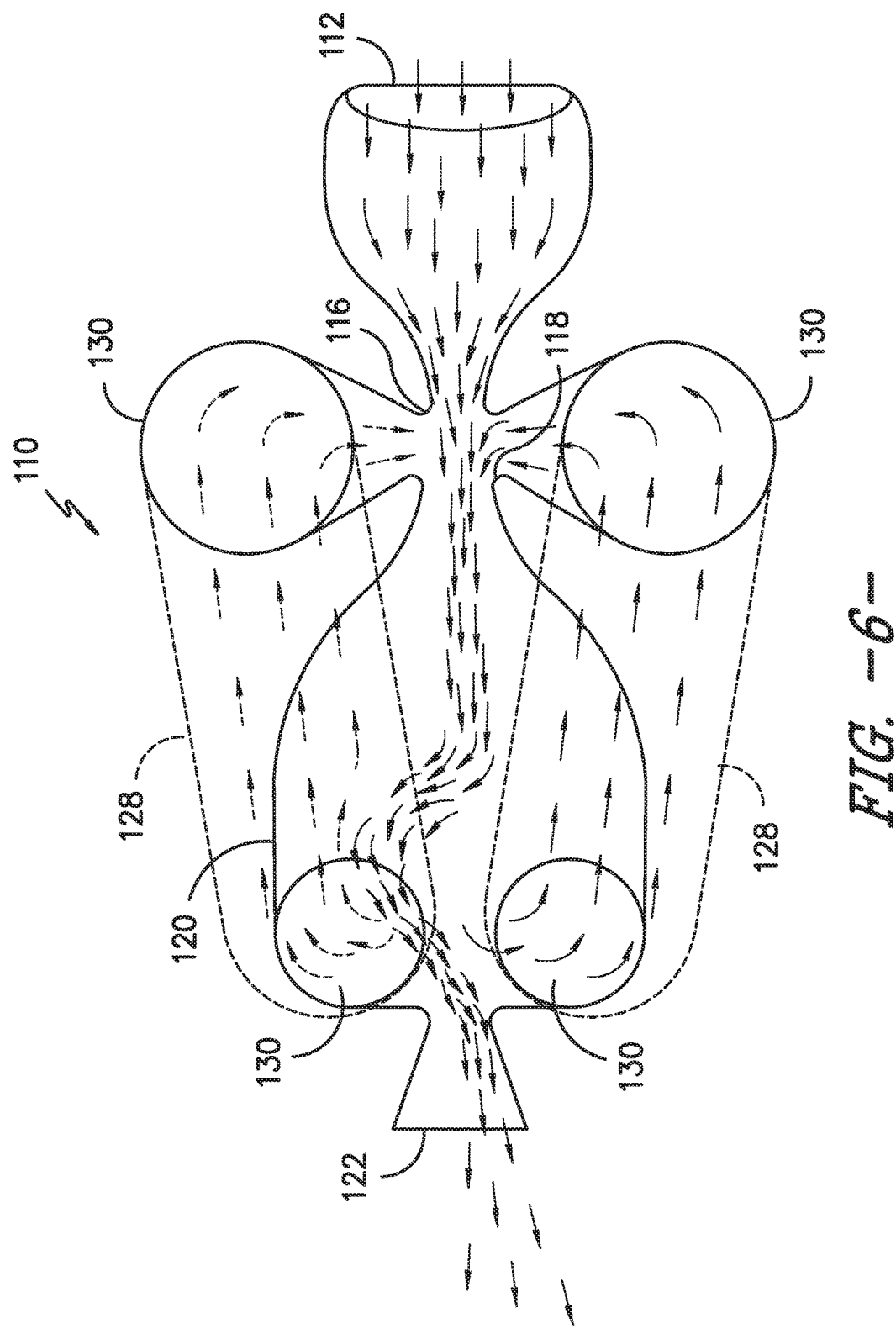
FIG. -6-

FLUIDIC CHIP FOR SPRAY NOZZLES

RELATED APPLICATIONS

This application is a national phase of International Application Number PCT/US2015/045929 filed Aug. 19, 2015 and claims priority from, U.S. Provisional Application No. 62/064,068 filed Oct. 15, 2014. The contents of such earlier application and all other documents referenced herein are hereby incorporated by reference as if set forth in their entirety.

TECHNICAL FIELD

The present disclosure relates generally to windshield washer systems for automobiles but is not limited to that art area. Such systems deliver a stream of fluid in a fan pattern to the windshield to aid in cleaning in conjunction with the scraping action of wiper blades.

BACKGROUND

Various forms of liquid fan spray generation systems are known. By way of example only, one exemplary system is disclosed in U.S. Pat. No. 4,645,126 (incorporated by reference). In such a fluidic oscillation system, a fluid such as a mixture of water and antifreeze is delivered from a power nozzle across an interaction chamber and then through an outlet throat for impingement against the windshield. At the initiation of flow, a power stream of the fluid mixture passes substantially directly across the interaction chamber. As flow progresses and the interaction chamber is filled, vortices are formed on either side of the power stream. As one vortex becomes dominant, the power stream is diverted against the opposite wall and oscillation begins so as to develop a fan spray.

In cold weather conditions, the surface tension and viscosity of the fluid delivered to a nozzle will increase. In those conditions, the fluid may be too thick in character to create velocity in the control channels of the spray system. Thus, in cold weather conditions, the fluid may take the path of least resistance and move straight through the interaction chamber. Under those circumstances, a desired fan spray does not develop.

One approach to address the problem of increased viscosity under cold weather conditions is to increase the pump pressure to promote oscillation. That is, the fluid is delivered to the spray device at a higher pressure. However, the ability to increase pump pressure is necessarily limited and may not be successful in producing, a full fan angle. Moreover, under cold weather conditions, the fluid characteristics of increased surface tension and viscosity will necessarily tend to reduce the fluid delivery pressure for the same energy input. Accordingly, a need exists for a spray device which promotes desirable fan spray characteristics at low temperature conditions without the need to substantially increase pump pressure to the device.

SUMMARY

The present disclosure supplies advantages and alternatives over the prior art by providing a fluidic chip defining an oscillator device for a spray system which provides a fan spray pattern of a fluid mixture at low temperature conditions while using standard fluid pump pressures.

In one exemplary aspect, the present disclosure provides a fluidic chip adapted to generate a fan spray pattern of a fluid mixture. The fluidic chip includes a constricted throat fluid entrance defining a power nozzle opening into a four-way intersection flow control zone. An interaction chamber is disposed immediately downstream from the four-way intersection flow control zone such that the fluid mixture passes from the four-way intersection flow control zone and into the interaction chamber. A pair of backflow control channels is disposed within a spaced-apart plane relative to the interaction chamber. The backflow control channels define fluid communication links between a downstream portion of the interaction chamber and the four-way intersection flow control zone. During operation of the fluidic chip, the backflow control channels alternate with one another to feed portions of the fluid mixture from the interaction chamber into opposing sides of the four-way intersection flow control zone in a cyclical manner. During operation of the fluidic chip, a beam of the fluid mixture is cyclically shifted between opposing sides of the interaction chamber to generate the fan spray pattern.

In one exemplary embodiment, the present disclosure provides a fluidic chip having a power nozzle feeding a flow control zone defined by a four-way intersection immediately upstream from an interaction chamber. A pair of backflow control channels is disposed within a spaced-apart plane relative to the interaction chamber. The backflow control channels define fluid communication links between a downstream portion of the interaction chamber and the power nozzle. The backflow control channels provide a low pressure return path and increased turbulence within the interaction chamber to maintain flow energy and promote oscillation even in low temperature conditions. In operation, the backflow control channels provide high capacity backflow to the flow control zone. At the flow control zone, the backflow vortex from the dominant control channel will guide the beam of fluid to the opposite side. When reaching that side, the other control channel is activated and becomes dominant thereby shifting the beam again. The fluid beam thus cycles back and forth between opposing sides to provide a fan pattern. The low pressure return path provided by the high capacity alternating control channels enhances velocity thereby facilitating operation at low temperatures. The inner diameter of the delivery hose feeding the fluidic chip may also be increased to promote filling of the chip sections.

In accordance with a further exemplary feature, the flow entrance into the four-way intersection may be substantially narrower than the opposing exit from the four-way intersection. The narrowed entrance relative to the exit increases the relative entrance velocity of the fluid and promotes the ability to bend the flow stream from side to side in response to vortices on either side of the intersection as those vortices alternately dominate.

Other features and advantages of the disclosure will become apparent to those of skill in the art upon review of the following detailed description, claims and drawings.

BRIEF DESCRIPTION OF THE DRAWINGS

The accompanying drawings, which are incorporated in, and which constitute a part of this specification, illustrate exemplary constructions and procedures in accordance with the present disclosure and, together with the general description of the disclosure given above and the detailed description set forth below, serve to explain the principles of the disclosure wherein:

FIG. 1 is a schematic perspective view illustrating an exemplary embodiment of a fluidic chip consistent with the present disclosure in attached relation to a fluid delivery line;

FIG. 2 is a cut-away schematic perspective view of the interaction chamber and associated narrowed entrance in an exemplary fluidic chip consistent with the present disclosure;

FIG. 3 is a cut-away schematic perspective view of backflow control channels adapted for fluid communication with the interaction chamber of FIG. 2 in an exemplary fluidic chip consistent with the present disclosure;

FIG. 4 is a schematic view illustrating the fluidic chip of FIGS. 1-3 and the associated fluid flow pattern with the backflow control channels shown in phantom;

FIG. 5 is a perspective view of the exemplary fluidic chip of FIG. 1 illustrating the fluid fan pattern in phantom; and FIG. 6 is a view similar to FIG. 4 illustrating another embodiment of a fluidic chip consistent with the present disclosure.

Before the exemplary embodiments of the invention are explained in detail, it is to be understood that the invention is in no way limited in its application or construction to the details and the arrangements of the components set forth in the following description or illustrated in the drawings. Rather, the invention is capable of other embodiments and of being practiced or being carried out in various ways. Also, it is to be understood that the phraseology and terminology used herein are for purposes of description only and should not be regarded as limiting. The use herein of terms such as "including" and "comprising" and variations thereof is meant to encompass the items listed thereafter and equivalents thereof as well as additional items and equivalents thereof.

DETAILED DESCRIPTION OF PREFERRED EMBODIMENTS

Reference will now be made to the various drawings, wherein to the extent possible, like elements are designated by like reference numerals in the various views. Referring now jointly to FIGS. 1, 4 and 5, an exemplary fluidic chip 10 consistent with the present disclosure is shown. The exemplary fluidic chip 10 is preferably substantially hollow and may be formed from suitable polymeric materials using practices as will be well known to those of skill in the art. In practice, the exemplary fluidic chip 10 may be operatively connected to an upstream pump system (now shown) for delivery of a fluid mixture 12 (designated by arrows in FIG. 4) into the chip via a delivery line 14 for ultimate discharge onto a windshield or other structure as may be desired. As shown, the discharge is in the form of a fan spray 15 so as to cover a relatively wide surface area. By way of example only, the fluid mixture 12 may be a mixture of water and either ethylene glycol or propylene glycol, although other fluids may likewise be used if desired.

As illustrated, the exemplary fluidic chip 10 includes a fluid entrance 16 of constricted throat geometry defining a converging/diverging power nozzle projecting into a four way intersection flow control zone 17 and towards an interaction chamber 20 downstream from the flow control zone 17. In this regard, as best seen in FIG. 4, the fluid mixture 12 passing through the fluid entrance 16 is channeled at relatively high velocity into the four-way intersection flow control zone 17 and then into the interaction chamber 20. The fluid entrance 16 to the flow control zone is preferably aligned along a common axis of symmetry with the interaction chamber 20 and an outlet throat 22. As best seen in FIG. 4, the outlet throat 22 is oriented to expel the fluid mixture to form the fan spray 15.

In the illustrated exemplary construction, the fluidic chip 10 includes a pair of backflow control channels 28 disposed in a plane spaced-apart from the plane defined by the interaction chamber 20. Each of the backflow control channels 28 defines a fluid communication link between a downstream portion of the interaction chamber 20 adjacent to the outlet throat and the four-way intersection flow control zone 17 immediately downstream from the fluid entrance 16. Accordingly, the portion of the fluid mixture 12 which does not exit through the outlet throat 22 may be recirculated by the backflow control channels 28 to the four way intersection flow control zone 17.

As best seen through joint reference to FIGS. 1-3 and 5, the interaction chamber 20 and the backflow control channels 28 may be formed by creating depressions of desired geometry in a pair of plate-like structures (plaques) which may then overlay one another in aligned relation to form the desired three-dimensional cavity. By way of example only, and not limitation, in accordance with one exemplary practice, the plate structure of FIG. 3 may be joined on top of the plate structure of FIG. 2 and may then be provided with a covering to establish the sealed cavity pattern illustrated in FIG. 5. In this regard, it will be understood that flow communication between the backflow control channels 28 and the interaction chamber 20 is provided by a pattern of aligned pass-through openings 30.

As shown, each of the backflow control channels 28 has a substantially straight sided configuration with rounded distal and proximal ends surrounding the pass-through openings. In the illustrated exemplary construction, the backflow control channels 28 each intersect the interaction chamber at bulbous distal collection zones 24 disposed on either side of the outlet throat 22. As illustrated, in the exemplary embodiment, the bulbous distal collection zones 24 may have curved distal faces which extend to distal positions below the opening to the outlet throat 22. The backflow control channels 28 each extend in angled relation away from the bulbous collection zones 24 to intersect with lateral proximal projections 26 extending outwardly away from the four way intersection flow control zone 17. In the illustrated exemplary construction, the lateral proximal projections 26 cooperatively form a dumbbell shape, although other geometries may likewise be used if desired.

In operation, the backflow control channels 28 are adapted to receive excess fluid mixture from a downstream portion of the interaction chamber 20 and to then transmit the fluid mixture back to the flow control zone at the four way intersection immediately downstream from the reduced diameter fluid entrance 16. As indicated previously, the backflow control channels 28 provide a low pressure return path to maintain flow energy and promote oscillation even in low temperature conditions.

It is contemplated that a fluidic chip 10 as contemplated by the present disclosure may be formed from any suitable polymeric material. By way of example only, and not limitation may include Nylon, polyester, acetal resin or the like as will be well known to those of skill in the art. By way of example only, and not limitation, according to one exemplary practice, plaques as illustrated in FIGS. 2 and 3 may be formed from suitable polymeric material by techniques such as injection molding or the like. The plaques may thereafter be joined together by techniques such as thermal bonding, adhesive bonding and the like to form an interior structure as illustrated and described in relation to FIGS. 1 and 5. Of course, individual components making up the fluidic chip 10 may also be formed as discrete parts which are then joined together.

In operation, only one of the backflow control channels 28 is active at a time. This feature is illustrated in FIG. 4 by the use of solid directional arrows in one control channel 28 and phantom directional arrows on the other control channel 28. During use, vortices will form on alternating sides of the four way intersection flow control zone 17 and the backflow delivered from the dominant control channel will guide the beam of fluid towards the opposite side of the interaction chamber 20. Thus, when the left control channel 28 is active, the fluid beam will be directed to the right and when the right control channel 28 is active, the fluid beam will be directed to the left. When the fluid beam reaches the opposing side, the other control channel becomes dominant thereby shifting the beam again. The fluid beam thus is forced to cycle back and forth between opposing sides to provide the desired fan spray 15. The low pressure return path provided by the high capacity alternating backflow control channels 28 enhances velocity thereby facilitating operation at low temperatures.

FIG. 6 illustrates another fluidic chip 110 consistent with the present disclosure, wherein elements corresponding to those described previously are designated by like reference numerals within a 100 series. As illustrated, in this embodiment, the fluid entrance 116 into the flow control zone at the four-way intersection has a significantly reduced cross section relative to the fluid exit 118 from the flow control zone. The fluid entrance 116 also has a reduced cross section relative to the backflow inlets from the backflow control channels 128 on either side of the flow control zone. It has been found that a fluid entrance 116 of substantially reduced cross section relative to the fluid exit 118 promotes enhanced velocity for a given flow rate thereby promoting turbulent conditions and vortex formation even at low temperatures. Such increased velocity and turbulent conditions may substantially aid in the ability to alternately bend the low temperature flow stream from side to side as described previously.

In operation of the embodiment of FIG. 6, only one of the backflow control channels 128 is active at a time. This feature is illustrated by the use of solid directional arrows in one control channel 128 and phantom directional arrows on the other control channel 128. Accordingly, during use, vortices will form on alternating sides of the four way intersection flow control zone and the backflow delivered from the dominant control channel will guide the beam of fluid towards the opposite side of the interaction chamber 120. Thus, when the left control channel 128 is active, the fluid beam will be directed to the right and when the right control channel 128 is active, the fluid beam will be directed to the left. The fluid beam thus is forced to cycle back and forth between opposing sides to provide the desired fan spray. Due to the enhanced velocity for a given flow rate and corresponding promotion of turbulent conditions and vortex formation, the embodiment of FIG. 6 may particularly desirable for use in very low temperatures.

In accordance with one exemplary aspect of the present disclosure, it has been found that the fluidic chip configurations as described may provide a substantially stable exit fan angle at temperatures as low as about −10 degrees Celsius. Moreover, a significant fan angle may be provided to temperatures as low as about −20 degrees Celsius.

Of course, variations and modifications of the foregoing are within the scope of the present disclosure. The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fluidic chip adapted to generate a fan spray pattern of a fluid mixture, the fluidic chip comprising:
a constricted throat fluid entrance defining a power nozzle opening into a four-way intersection flow control zone;
an interaction chamber immediately downstream from the four-way intersection flow control zone such that the fluid mixture passes from the four-way intersection flow control zone and into the interaction chamber; and
a pair of backflow control channels disposed within a spaced-apart plane that is offset from a plane of the interaction chamber, wherein the backflow control channels define fluid communication links between a downstream portion of the interaction chamber and the four-way intersection flow control zone and wherein during operation of the fluidic chip the backflow control channels alternate with one another to feed portions of the fluid mixture from the intersection chamber into opposing sides of the four-way intersection flow control zone in a cyclical manner and wherein during operation of the fluidic chip, a beam of the fluid mixture is cyclically shifted between opposing sides of the interaction chamber to generate the fan spray pattern.

2. The fluidic chip as recited in claim 1, wherein the constricted throat fluid entrance is aligned along a common axis of symmetry with the interaction chamber.

3. The fluidic chip as recited in claim 2, wherein the constricted throat fluid entrance is aligned along the common axis of symmetry with an outlet throat.

4. The fluidic chip as recited in claim 3, wherein each of the backflow control channels has a substantially straight sided configuration with rounded distal and proximal ends.

5. The fluidic chip as recited in claim 4, wherein the backflow control channels intersect the interaction chamber at bulbous distal collection zones disposed on either side of the outlet throat.

6. The fluidic chip as recited in claim 5, wherein the bulbous distal collection zones each has a curved distal face which extends to a distal position underneath an opening to the outlet throat.

7. The fluidic chip as recited in claim 5, wherein the backflow control channels each extends in angled relation away from the bulbous collection zones to intersect with lateral proximal projections extending outwardly away from the four-way intersection flow control zone.

8. The fluidic chip as recited in claim 7, wherein the lateral proximal projections provide expanded areas that connect to the four-way intersection flow control zone.

9. The fluidic chip as recited in claim 1, wherein the fluidic chip is formed from a polymer.

10. The fluidic chip as recited in claim 9, wherein the polymer is selected from the group consisting of nylon, polyester and acetal resin.

11. The fluidic chip as recited in claim 1, wherein the constricted throat fluid entrance has a smaller cross section than an aligned fluid passage between the four-way intersection flow control zone and the interaction chamber.

12. A fluidic chip adapted to generate a fan spray pattern of a fluid mixture, the fluidic chip comprising:
a constricted throat fluid entrance defining a power nozzle opening into a four-way intersection flow control zone;
an interaction chamber immediately downstream from the four-way intersection flow control zone such that the fluid mixture passes from the four-way intersection flow control zone and into the interaction chamber, wherein the constricted throat fluid entrance is aligned along a common axis of symmetry with the interaction chamber and an outlet throat; and
a pair of backflow control channels disposed within a spaced-apart plane that is offset from a plane of the interaction chamber, wherein the backflow control channels define fluid communication links between a downstream portion of the interaction chamber and the four-way intersection flow control zone and wherein during operation of the fluidic chip the backflow control channels alternate with one another to feed portions of the fluid mixture from the interaction chamber into opposing sides of the four-way intersection flow control zone in a cyclical manner and wherein during operation of the fluidic chip, a beam of the fluid mixture is cyclically shifted between opposing sides of the interaction chamber to generate the fan spray pattern.

13. The fluidic chip as recited in claim 12, wherein each of the backflow control channels has a substantially straight sided configuration with rounded distal and proximal ends.

14. The fluidic chip as recited in claim 13, wherein the backflow control channels intersect the interaction chamber at bulbous distal collection zones disposed on either side of the outlet throat.

15. The fluidic chip as recited in claim 14, wherein the bulbous distal collection zones each has a curved distal face which extends to a distal position underneath an opening to the outlet throat.

16. The fluidic chip as recited in claim 15, wherein the backflow control channels each extends in angled relation away from the bulbous collection zones to intersect with lateral proximal projections extending outwardly away from the four-way intersection flow control zone.

17. The fluidic chip as recited in claim 16, wherein the lateral proximal projections provide expanded areas that connect to the four-way intersection flow control zone.

18. The fluidic chip as recited in claim 17, wherein the fluidic chip is formed from a polymer.

19. The fluidic chip as recited in claim 18, wherein the constricted throat fluid entrance has a smaller cross section than an aligned fluid passage between the four-way intersection flow control zone and the interaction chamber.

20. A fluidic chip adapted to generate a fan spray pattern of a fluid mixture, the fluidic chip comprising:
a constricted throat fluid entrance defining a power nozzle opening into a four-way intersection flow control zone;
an interaction chamber immediately downstream from the four-way intersection flow control zone such that the fluid mixture passes from the four-way intersection flow control zone and into the interaction chamber, wherein the constricted throat fluid entrance is aligned along a common axis of symmetry with the interaction chamber and an outlet throat; and
a pair of backflow control channels disposed within a spaced-apart plane that is offset from a plane of the interaction chamber, wherein the backflow control channels define fluid communication links between a downstream portion of the interaction chamber and the four-way intersection flow control zone and wherein during operation of the fluidic chip the backflow control channels alternate with one another to feed portions of the fluid mixture form the interaction chamber into opposing sides of the four-way intersection flow control zone in a cyclical manner and wherein during operation of the fluidic chip, a beam of the fluid mixture is cyclically shifted between opposing sides of the interaction chamber to generate the fan spray pattern, wherein the constricted throat fluid entrance has a smaller cross section than an aligned fluid passage between the four-way intersection flow control zone and the interaction chamber and wherein each of the backflow control channels has a substantially straight sided configuration with rounded distal and proximal ends.

* * * * *